(12) United States Patent
Choi et al.

(10) Patent No.: US 9,061,478 B2
(45) Date of Patent: Jun. 23, 2015

(54) CONDUCTIVE NONWOVEN PRESSURE SENSITIVE ADHESIVE TAPES AND ARTICLES THEREFROM

(75) Inventors: Jeong-Wan Choi, Suwon-si (KR); Jin-Bae Kim, Ansan-si (KR)

(73) Assignee: 3M Innovative Properties Company, St. Paul, MN (US)

( * ) Notice: Subject to any disclaimer, the term of this patent is extended or adjusted under 35 U.S.C. 154(b) by 204 days.

(21) Appl. No.: 13/473,731

(22) Filed: May 17, 2012

(65) Prior Publication Data

US 2012/0295052 A1 Nov. 22, 2012

Related U.S. Application Data

(60) Provisional application No. 61/487,486, filed on May 18, 2011, provisional application No. 61/534,090, filed on Sep. 13, 2011.

(51) Int. Cl.
| | |
|---|---|
| *C09J 7/02* | (2006.01) |
| *B32B 15/02* | (2006.01) |
| *B32B 15/04* | (2006.01) |

(Continued)

(52) U.S. Cl.
CPC .............. *B32B 5/022* (2013.01); *Y10T 428/25* (2015.01); *Y10T 428/1438* (2015.01); *Y10T 428/254* (2015.01); *Y10T 428/2804* (2015.01); *Y10T 428/251* (2015.01); *Y10T 428/256* (2015.01); *Y10T 428/259* (2015.01); *Y10T 428/252* (2015.01); *Y10T 428/14* (2015.01); *B32B 7/06* (2013.01); *B32B 15/14* (2013.01); *B32B 15/20* (2013.01); *B32B 2264/105* (2013.01); *B32B 2307/202* (2013.01); *B32B 2405/00* (2013.01); *C09J 9/02* (2013.01)

(58) Field of Classification Search
CPC .................... C09J 2400/163; C09J 2400/166; C09J 2201/128; C09J 2201/40; C09J 7/0217; C09J 7/02; C09J 7/0296; C09J 7/0239; C09J 7/0264; C09J 7/0292; C09J 9/02; H01L 21/6836; H01L 21/76804; B32B 15/00; B32B 15/04; B32B 15/14; B32B 15/20; B32B 15/022; B32B 7/06; B32B 2250/03; B32B 2250/04; B32B 2250/05; Y10T 428/14; Y10T 428/1405; Y10T 428/1414; Y10T 428/1438; Y10T 428/1443; Y10T 428/1481; Y10T 428/28; Y10T 428/2804; Y10T 428/2848
USPC ........... 428/40.1, 40.2, 40.4, 40.9, 41.1, 41.9, 428/343, 344, 354
See application file for complete search history.

(56) References Cited

U.S. PATENT DOCUMENTS

| | | | |
|---|---|---|---|
| 2,808,352 | A | 10/1957 | Coleman et al. |
| 3,475,213 | A | 10/1969 | Stow |

(Continued)

FOREIGN PATENT DOCUMENTS

| | | | |
|---|---|---|---|
| DE | 10034112 A1 | * | 5/2003 |
| EP | 256756 A2 | * | 2/1988 |

(Continued)

*Primary Examiner* — Patricia L Nordmeyer

(57) ABSTRACT

A conductive single-sided tape includes a conductive, nonwoven adhesive layer and a metal layer positioned adjacent the conductive, nonwoven adhesive layer. The conductive, nonwoven adhesive layer includes a conductive nonwoven substrate having a plurality of passageways, an adhesive material positioned within at least a portion of the passageways and a plurality of metal particles dispersed within the adhesive material.

18 Claims, 2 Drawing Sheets

(51) Int. Cl.
    *B32B 5/02*     (2006.01)
    *B32B 7/06*     (2006.01)
    *B32B 15/14*    (2006.01)
    *B32B 15/20*    (2006.01)
    *C09J 9/02*     (2006.01)

(56) References Cited

U.S. PATENT DOCUMENTS

| | | |
|---|---|---|
| 3,497,383 A | 2/1970 | Olyphant, Jr. et al. |
| 3,762,946 A | 10/1973 | Stow et al. |
| 3,778,306 A | 12/1973 | Stow |
| 4,113,981 A | 9/1978 | Fujita et al. |
| 4,548,862 A | 10/1985 | Hartman |
| 4,606,962 A | 8/1986 | Reylek et al. |
| 4,988,550 A * | 1/1991 | Keyser et al. ............... 428/41.1 |
| 5,082,595 A | 1/1992 | Glackin |
| 5,087,494 A | 2/1992 | Calhoun et al. |
| 5,240,761 A | 8/1993 | Calhoun et al. |
| 5,300,340 A | 4/1994 | Calhoun et al. |
| 5,672,400 A * | 9/1997 | Hansen et al. ............... 428/40.1 |
| 5,939,190 A * | 8/1999 | Pfaff et al. ................... 428/344 |
| 6,410,137 B1 * | 6/2002 | Bunyan ......................... 428/356 |
| 2011/0065217 A1 * | 3/2011 | Terada et al. ................... 438/17 |

FOREIGN PATENT DOCUMENTS

| | | |
|---|---|---|
| IE | 55524 | 10/1990 |
| WO | WO 2005/017012 | 2/2005 |

* cited by examiner

CONDUCTIVE NONWOVEN PRESSURE SENSITIVE ADHESIVE TAPES AND ARTICLES THEREFROM

CROSS REFERENCE TO RELATED APPLICATIONS

This application claims priority from U.S. Provisional Application Ser. Nos. 61/487,486 filed May 18, 2011 and 61/534,090 filed Sep. 13, 2011, the disclosures of which are incorporated by reference in their entirety herein.

TECHNICAL FIELD

The present invention is related generally to conductive tapes. In particular, the present invention is a conductive single sided tape having a conductive nonwoven pressure sensitive adhesive layer and a metal layer.

BACKGROUND

Electrically conductive tapes have numerous constructions and have conventionally been formed using various methods. For example, in one construction, an electrically conductive adhesive tape can be formed by dispersing finely divided silver in a pressure sensitive adhesive and coating the adhesive on an electrically conductive backing. In another construction, a conductive tape is formed with a monolayer of large conductive particles on the pressure sensitive adhesive. In yet another embodiment, an electrically conductive backing is embossed to have a plurality of closely spaced electrically conductive projections that extend almost through the layer of adhesive. One characteristic common to all of these constructions is that they do not provide reliable electrical connections to very small size contacts.

There is an increasing demand for thinner conductive single-sided tapes which can provide reliable electrical connection to very small contacts. This is in part because connections to small contacts are becoming more important for many electronic uses of conductive tapes. One method of currently accomplishing this is to include a layer of adhesive made conductive by the inclusion of small, complex metal particles having a low apparent density for reliable electrical connections to very small contacts.

There has also been an increasing demand for thinner conductive single-sided tapes which can provide good workability and handling properties. This is generally because most foil tapes are easily curled when the release liner is removed from the adhesive. The curling may become an issue as the foil tapes become thinner.

SUMMARY

In one embodiment, the present disclosure relates to a conductive, single-sided tape including a conductive nonwoven adhesive layer and a metal layer positioned adjacent the conductive nonwoven adhesive layer. The conductive, nonwoven adhesive layer includes a conductive, nonwoven substrate having a plurality of passageways, an adhesive material positioned within at least a portion of the passageways and a plurality of metal particles dispersed within the adhesive material.

In another embodiment, the present invention is a conductive, single-sided tape. The conductive, single-sided tape includes a conductive nonwoven substrate, an adhesive embedded within the conductive nonwoven substrate, a plurality of metal particles dispersed within the adhesive, and a metal layer positioned adjacent the conductive, nonwoven substrate.

These figures are not drawn to scale and are intended merely for illustrative purposes.

DETAILED DESCRIPTION

Figure 1A:
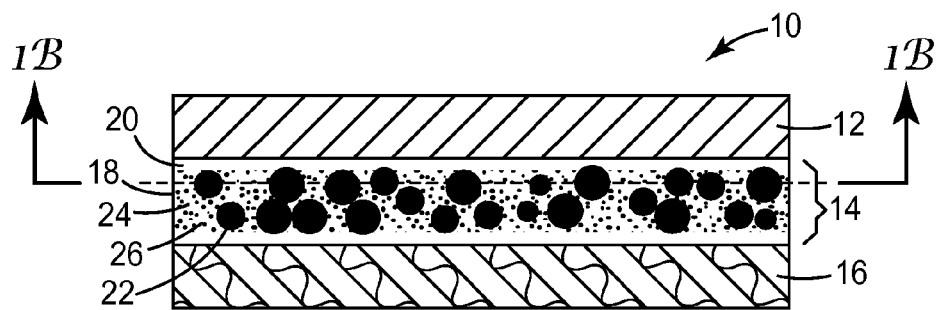
FIG. 1A is a cross-sectional view of a first embodiment of a conductive, single-sided tape of the present disclosure.

FIG. 1A shows a cross-sectional view of a first embodiment of a conductive, single-sided tape 10 including a metal layer 12 and a conductive, nonwoven adhesive layer 14 on a release liner 16. The conductive, nonwoven adhesive layer 14 is positioned between the metal layer 12 and release liner 16 and includes a conductive nonwoven substrate 18, an adhesive material 20 embedded within the conductive nonwoven substrate 18 and metal particles 22 dispersed within the adhesive material 20. The conductive, single-sided tape 10 of the present invention provides an adhesive layer that approaches volume-conductivity, results in reliable and excellent electrical performance for small size contacts and allows for good workability with less curling during tape assembly.

The conductive, nonwoven adhesive layer 14 provides good electrical performance and handling. The conductive, nonwoven adhesive layer 14 includes a conductive non-woven, substrate 18 which is porous and an adhesive material 20 positioned within pores or passageways 24 of the conductive nonwoven substrate 18. Use of the term "passageways" throughout the specification will refer to pores or passageways. Examples of suitable nonwoven substrate materials that may be metalized to make them conductive include, but are not limited to: polyethylene terephthalate (PET) fabric, nylon, polyester, vinylon, acrylic fiber and rayon. Although the conductive, nonwoven adhesive layer 14 is discussed as including a conductive nonwoven substrate fabric, any porous substrate having passageways and capable of being made conductive, e.g. through metallization of a non-conductive material, may be used, including woven fabrics, porous membranes and foams. A metal or carbon fiber based woven or non-woven material may also be employed.

Figure 1B:
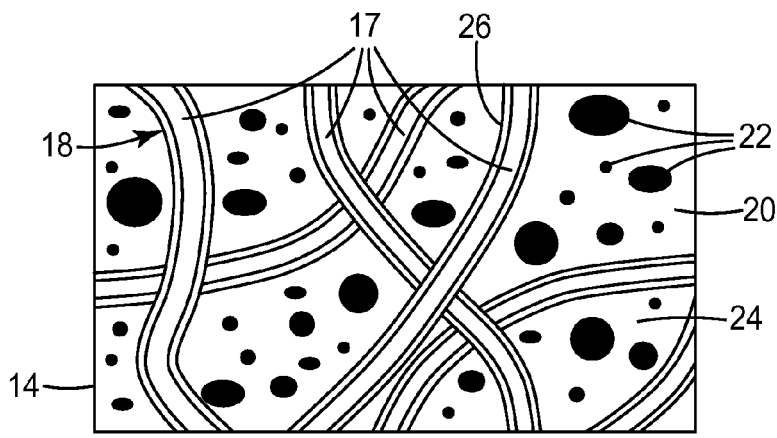
FIG. 1B is a schematic top plan view of the layer 14 of FIG. 1A

FIG. 1B shows a schematic top plan view of the conductive nonwoven adhesive layer 14 having a conductive nonwoven substrate 18, which is formed by a nonwoven web 17 (illustrated as a plurality of fibers 17) that has been coated with a conductive coating 26. The conductive coating can be disposed on the surface of fibers and in some embodiments, penetrate into the fiber. Adhesive material 20 containing metal particles 22 are disposed in the passageways or pores 24 of the conductive nonwoven substrate 18.

The conductive coating can include, for example, copper, nickel, silver, tin, cobalt, chromium, aluminum or any combination thereof. In one embodiment, the conductive nonwoven substrate 18 is coated with a layer of copper and a corrosion resistant layer of nickel, silver or tin. One suitable example of a conductive nonwoven substrate is Ni/Cu/Ni/

PET. In one embodiment, the conductive nonwoven substrate 18 is between about 5 and about 100 µm thick, particularly between about 10 and about 80 µm thick and more particularly between about 20 and about 50 µm thick.

The adhesive material 20 fills at least a portion of the passageways 24 of the conductive nonwoven substrate 18, resulting in improved cohesion in the conductive, nonwoven adhesive layer 14. In one embodiment, the adhesive material 20 substantially fills the entirety of the passageways 24. However, due to small bubbles that become trapped in the conductive nonwoven substrate 18 during coating, the adhesive material 20 may not fill 100% of the volume of the passageways 24. In one embodiment, the passageways are filled with adhesive material 20 such that the conductive nonwoven substrate 18 includes less than about 10% voids, particularly less than about 5% voids, and more particularly less than about 2% voids.

Various manufacturing methods can be employed to form nonwoven adhesive layer 14 including, but not limited to: lamination of a transfer adhesive to one or both sides of the appropriate nonwoven, imbibing an adhesive solution, i.e. an adhesive contained in solvent, into at least some of the pores/passageways of the nonwoven followed by solvent removal and optional curing or imbibing a substantially 100% solids adhesive precursor solution, comprising monomers, oligomers and/or dissolved polymers, into the pores/passageways of the nonwoven followed by curing of the adhesive precursor solution to form an adhesive. The imbibing method, i.e. allowing a liquid to flow into at least some of the pores/passageways of the nonwoven, can be accomplished by any known methods including dip coating, spray coating, knife coating, roll coating and the like.

Figure 2:
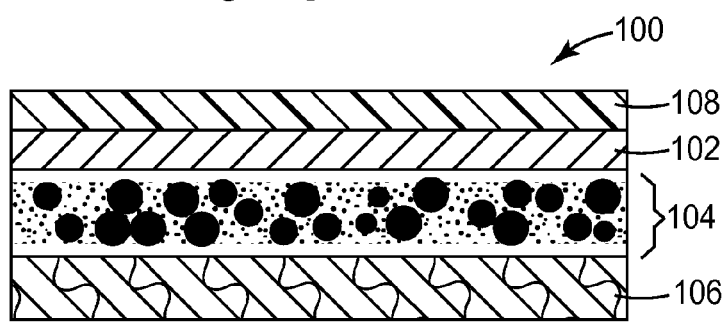
FIG. 2 is a cross-sectional view of a second embodiment of a conductive, single-sided tape of the present disclosure.
Figure 3:
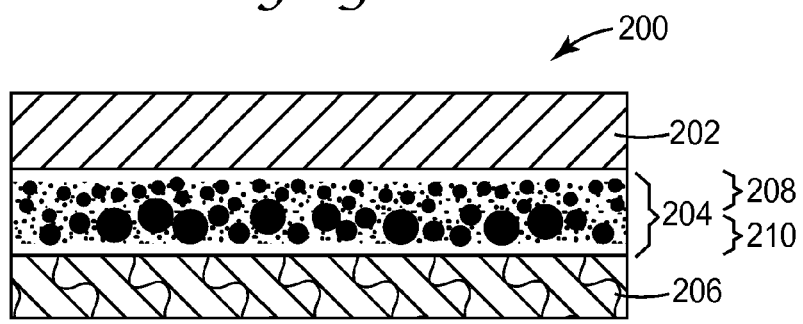
FIG. 3 is a cross-sectional view of a third embodiment of a conductive, single-sided tape of the present disclosure.

The method used to fabricate the conductive, nonwoven adhesive layer 14 can affect the resulting structure of conductive, nonwoven adhesive layer 14. When using a lamination technique to laminate a transfer adhesive to the conductive nonwoven substrate 18, the adhesive material 20 may be in the passageways 24 at or near the surface of one or both sides of the conductive nonwoven substrate 18. The depth of penetration of the adhesive material 20 into the pores/passageways 24 of the conductive nonwoven substrate 18 is dependent on the pressure applied during lamination, the flow properties of the transfer adhesive and properties of the conductive nonwoven substrate 18 such as, for example, the pore size and thickness of the conductive nonwoven substrate 18. To facilitate penetration of the adhesive into the nonwoven, the nonwoven/adhesive laminate may be annealed at elevated temperatures. In one embodiment, the nonwoven/adhesive laminate is annealed at between about 30° C. and about 100° C. Under appropriate conditions, the adhesive material 20 may be able to penetrate the entire depth of the conductive nonwoven substrate 18. In another embodiment, when using an imbibing method, the adhesive material 20 may at least partially fill at least some of the pores/passageways 24 of the conductive nonwoven substrate 18. Thus, depending on the method used to fabricate the conductive, nonwoven adhesive layer 14, the adhesive material 20 may penetrate the entire thickness of the conductive nonwoven substrate 18 as well as be deposited as a layer on the surfaces of the conductive nonwoven substrate 18 adjacent to the metal layer 12 and the release liner 16, as shown in FIGS. 1-3. In some embodiments, the adhesive material 20 may not penetrate the entire width of the conductive nonwoven substrate 18 and/or may not extend outside the surfaces of the conductive nonwoven substrate 18 and would not depart from the intended scope of the present invention.

In one embodiment, the adhesive material 20 is a pressure sensitive adhesive (PSA) material. To achieve PSA characteristics, the polymer(s) used for the adhesive can be tailored to have a resultant glass transition temperature (Tg) of less than about 0° C. Examples of suitable PSA materials include, but are not limited to: rubber-based PSAs, silicone based PSAs and acrylic based PSAs. Particularly suitable pressure sensitive adhesive are (meth)acrylate copolymers. Such copolymers typically are derived from monomers comprising about 40% by weight to about 98% by weight, often at least 70% by weight, or at least 85% by weight, or even about 90% by weight, of at least one alkyl (meth)acrylate monomer that, as a homopolymer, has a Tg of less than about 0° C.

Examples of such alkyl (meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl acrylate, and mixtures thereof. Optionally, other vinyl monomers and alkyl (meth)acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl (meth)acrylate monomers and copolymerizable basic or acidic monomers, provided that the Tg of the resultant (meth)acrylate copolymer is less than about 0° C.

In some embodiments, it is desirable to use (meth)acrylate monomers that are free of alkoxy groups. Alkoxy groups are understood by those skilled in the art.

When used, basic (meth)acrylate copolymers useful as the pressure sensitive adhesive matrix typically are derived from basic monomers comprising about 2% by weight to about 50% by weight, or about 5% by weight to about 30% by weight, of a copolymerizable basic monomer. Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinylpyrrolidone, N-vinylcaprolactam, acrylonitrile, N-vinylformamide, (meth)acrylamide, and mixtures thereof.

When used to form the pressure sensitive adhesive matrix, acidic (meth)acrylate copolymers typically are derived from acidic monomers comprising about 2% by weight to about 30% by weight, or about 2% by weight to about 15% by weight, of a copolymerizable acidic monomer. Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, beta-carboxyethyl acrylate, 2-sulfoethyl methacrylate, styrenesulfonic acid, 2-acrylamido-2-methylpropanesulfonic acid, vinylphosphonic acid, and the like, and mixtures thereof. Due to their availability, typically ethylenically unsaturated carboxylic acids are used.

In certain embodiments, the poly(meth)acrylic pressure sensitive adhesive matrix is derived from between about 1 and about 20 weight percent of acrylic acid and between about 99 and about 80 weight percent of at least one of isooctyl acrylate, 2-ethylhexyl acrylate or n-butyl acrylate composition. In some embodiments, the pressure sensitive adhesive matrix is derived from between about 2 and about 10 weight percent acrylic acid and between about 90 and about 98 weight percent of at least one of isooctyl acrylate, 2-ethylhexyl acrylate or n-butyl acrylate composition.

The pressure sensitive adhesive can be inherently tacky. If desired, tackifiers can be added to the adhesive precursor solution before formation of the pressure sensitive adhesive. In one embodiment, the adhesive precursor solution includes up to about 30% tackifier, or up to about 50% tackifier. Useful tackifiers include, for example, rosin ester resins, aromatic hydrocarbon resins, aliphatic hydrocarbon resins, and terpene resins. In general, light-colored tackifiers selected from hydrogenated rosin esters, terpenes, or aromatic hydrocarbon resins can be used.

Other materials can be added for special purposes, including, for example, fillers, oils, plasticizers, antioxidants, UV stabilizers, pigments, curing agents and polymer additives. Exemplary fillers include, but are not limited to a heat conductive filler, a flame resistant filler, an anti-static agent, a foaming agent, polymeric microspheres and thermosets.

The adhesive material may have additional components added to the adhesive precursor solution. For example, the mixture may include a multifunctional crosslinker. Such crosslinkers include thermal crosslinkers which are activated during the drying step of preparing solvent coated adhesives and crosslinkers that copolymerize during the polymerization step. Such thermal crosslinkers may include multifunctional isocyanates, aziridines, multifunctional (meth)acrylates, and epoxy compounds. Exemplary crosslinkers include difunctional acrylates such as 1,6-hexanediol diacrylate or multifunctional acrylates such as are known to those of skill in the art. Useful isocyanate crosslinkers include, for example, an aromatic diisocyanate available as DESMODUR L-75 from Bayer, Cologne, Germany Ultraviolet, or "UV", activated crosslinkers can also be used to crosslink the pressure sensitive adhesive. Such UV crosslinkers may include benzophenones and 4-acryloxybenzophenones.

In addition, the adhesive precursor solutions for the provided adhesive materials can include a thermal or a photoinitiator. Examples of thermal initiators include peroxides such as benzoyl peroxide and its derivatives or azo compounds such as VAZO 67, available from E. I. du Pont de Nemours and Co. Wilmington, Del., which is 2,2'-azobis-(2-methylbutyronitrile), or V-601, available from Wako Specialty Chemicals, Richmond, Va., which is dimethyl-2,2'-azobisisobutyrate. A variety of peroxide or azo compounds are available that can be used to initiate thermal polymerization at a wide variety of temperatures. The adhesive precursor solutions can include a photoinitiator. Particularly useful are initiators such as IRGACURE 651, available from BASF, Tarrytown, N.Y., which is 2,2-dimethoxy-2-phenylacetophenone. Typically, the crosslinker, if present, is added to the adhesive precursor solutions in an amount of from about 0.05 parts by weight to about 5.00 parts by weight based upon the other constituents in the mixture. The initiators are typically added to the adhesive precursor solutions in the amount of from about 0.05 parts by weight to about 2 parts by weight.

In other embodiments, the adhesive material 20 may be a thermosetting adhesive material. More specifically, an adhesive material that can be B-staged (a B-stageable material) may be used. Ultraviolet (UV) B-staging is preferred. In this approach, a dual cure adhesive composition is employed. The first cure is initiated by UV or another light source which initiates a curing reaction to thicken the composition prior to final curing. The final curing is conducted using a thermal curing system. The adhesive composition contains UV curable monomers and/or oligomers which are mixed with thermally curable monomers and or oligomers. In addition, the corresponding initiators and/or curing agents for both curing mechanisms will be added to the adhesive mixture. After thorough mixing, the adhesive composition is coated on at least one release liner and may be coated between two release liners. During this coating process, a conductive non-woven may be simultaneously embedded in the adhesive coating. The coated composition is then exposed to UV radiation to at least partially cure the UV curable components of the composition. At this stage, the composition still has a sufficient amount of tack to enable it to be a pressure sensitive adhesive.

The UV curable monomomers and initiators may be those previously described herein. The thermosetting monomers and/or oligomers of the adhesive composition may be epoxy and phenoxy based materials. Other thermosetting resins include urethane and phenolic based materials. In addition, one or more appropriate crosslinkers, curatives and/or accelerators may be added to the adhesive composition. For example, for an epoxy, a crosslinkers such as a dicyandiamide may be used. A preferred dicyandiamide is available under the trade designation Dicyanex 1400B from Air Products and Chemicals, Inc., Allentown, Pa. Accelerators may also be added, a preferred accelerator for an epoxy being a urea-based accelerator, e.g. a urea based accellerator available under the trade designation Amicure UR from Air Products and Chemicals, Inc.

In one embodiment, the conductive, nonwoven adhesive layer 14 includes metal particles 22 dispersed within the adhesive material 20. The metal particles 22 are dispersed in the adhesive material 20, which is then embedded into the conductive nonwoven substrate 18. Examples of suitable metal particles include, but are not limited to: nickel, copper, tin, aluminum, silver; silver coated copper, silver coated nickel, silver coated aluminum, silver coated tin, silver coated gold; nickel coated copper, nickel coated silver; silver coated or nickel coated: graphite, glass, ceramics, plastics, silica, elastomers, and mica. Also, combinations of these materials can be used in the present disclosure as the metal particles. In one embodiment, the metal particles 22 dispersed in the adhesive material 20 include nickel. An example of suitable, commercially available nickel includes, but is not limited to, T123 from Inco, Vale Canada Limited, Toronto, Canada. In one embodiment, the adhesive material 20 includes between about 1 and about 70% metal particles, particularly between about 2 and about 60% metal particles and more particularly between about 3 and about 50% metal particles. The metal particles have a mean particle size in the range of about 0.5 to 100 microns, preferably from about 1 to 50 microns and more preferably from about 2 to 20 microns.

The conductive, nonwoven adhesive layer 14 can optionally include a conductive filler. However, a conductive filler may not be necessary as the coating thickness of the conductive, nonwoven adhesive layer 14 is relatively thin, allowing the conductive, nonwoven adhesive layer 14 to penetrate the thin adhesive layer and directly contact the metal layer 12.

The conductive, nonwoven adhesive layer 14 can be laminated onto various metal layers to form a single-sided tape structure. The metal layer 12 provides improved physical properties and electromagnetic interference (EMI) shielding.

Exemplary metal layers include, but are not limited to: aluminum foil, copper foil and tin plated copper foil. In one embodiment, the metal layer 12 is between about 2 and about 150 um thick, particularly between about 5 and about 125 um thick and more particularly between about 6 and about 30 um thick.

The release liner 16 is positioned along a surface of the conductive, nonwoven adhesive layer 14 and protects the conductive, nonwoven adhesive layer 14 from dust and debris until ready for use. Examples of suitable release liners include but are not limited to, PET release liners and paper release liners.

Due to its construction, the conductive, single-sided tape 10 is conductive along the X, Y and Z-axes. In one embodiment, the conductive, single-sided tape 10 is between about 20 and about 150 μm thick, particularly between about 25 and about 125 μm thick and more particularly between about 30 and about 100 μm thick.

FIG. 2 shows a cross-sectional view of a second embodiment of a conductive, single-sided tape 100 including a metal layer 102 and a conductive, nonwoven adhesive layer 104 on a release liner 106. The second embodiment of the conductive, single-sided tape 100 is similar in construction and function to the first embodiment of the conductive, single-sided tape 10 except that the second embodiment of the conductive, single-sided tape 100 includes a polymeric film 108 positioned on the metal layer 102 opposite the conductive, nonwoven adhesive layer 104.

The polymeric film 108 is one of various general tape structures and functions to increase the tensile strength of the conductive, single-sided tape 100 and/or to insulate the z-axis of the conductive, single-sided tape 100 and/or to protect the metal layer 102 from corrosion and physical damage. In one embodiment, the polymeric film is formed directly onto the metal layer 102. In another embodiment, the polymeric film is laminated with an adhesive. Exemplary polymeric films include, but are not limited to, non-conductive films. In one embodiment, the polymeric film 108 is a black, colored PET film. In one embodiment, the polymeric film 108 has a thickness of between about 2.5 and about 20 microns, particularly between about 1 and about 15 microns and more particularly between about 1.5 microns and about 5 microns.

A very thin metal layer can be directly plated onto the polymeric film, for example, by metal evaporation and sputtering. Exemplary plated metals include gold, silver and other metals.

FIG. 3 shows a cross-sectional view of a third embodiment of a conductive, single-sided tape 200 including a metal layer 202 and a conductive, nonwoven adhesive layer 204 on a release liner 206. The third embodiment of the conductive, single-sided tape 200 is similar in construction and function to the first embodiment of the conductive, single-sided tape 10 except that the third embodiment of the conductive, single-sided tape 200 includes a first adhesive layer 208 and a second adhesive layer 210 within the conductive, nonwoven adhesive layer.

The first and second adhesive layers 208 and 210 may include the same particle types or may include different particle types. In one embodiment, both the first and second adhesive layers 208 and 210 include the same particle type. For example, both the first and second adhesive layers 208 and 210 may include nickel particles. In another embodiment, the first and the second adhesive layers 208 and 210 include different particle types. For example, the first adhesive layer 208 may include nickel particles while the second adhesive layer 210 includes silver particles. In addition, the first and second adhesive layers 208 and 210 may include the same number of particle types or may include a different number of particle types. In one embodiment, both the first and second adhesive layers 208 and 210 include two particle types. In another embodiment, the first adhesive layer 208 includes only one particle type while the second adhesive layer 210 includes more than one particle type. For example, the first adhesive layer 208 may include only nickel particles while the second adhesive layer 210 includes silver and nickel particles. Any combination of particle types may be included in the first and second adhesive layers 208 and 210 without departing from the intended scope of the present invention.

In one embodiment, both the first and second adhesives layers 208 and 210 are acrylic based. The compositions of the acrylic copolymers of the first and second adhesive layers 208 and 210 may be the same or may be different.

One method of forming the conductive, single-sided tape 10, 100, 200 of the present invention is by using a dual liner coating and UV curing process. The method includes preparing a syrup including an adhesive and a photoinitiator to form a prepolymer, imbibing the prepolymer in pores of a conductive nonwoven substrate, passing the conductive nonwoven substrate and prepolymer between a first and second liner, curing the prepolymer to form a conductive nonwoven embedded pressure sensitive adhesive layer, removing the first liner from the conductive nonwoven embedded pressure sensitive adhesive layer, and laminating the conductive nonwoven embedded pressure sensitive adhesive layer onto a metal backing.

Another method of forming the conductive, single-sided tape 10, 100, 200 of the present invention uses a single liner coating and thermal curing process. The method includes coating an acrylic copolymer solution onto the conductive nonwoven by directly imbibing the acrylic copolymer solution into the pores or passageways of the conductive nonwoven substrate, passing the acrylic copolymer solution and the conductive nonwoven substrate on a liner, drying and heat curing the acrylic copolymer to form a conductive nonwoven embedded pressure sensitive adhesive layer and laminating the conductive nonwoven embedded pressure sensitive adhesive layer on to a metal backing.

Another method of forming the conductive, single-sided tape 10, 100, 200 of the present invention includes using a single liner coating, thermal curing and transfer laminating process. The method includes coating an acrylic copolymer solution onto a release liner, drying and heat curing the coated acrylic copolymer solution on the liner and transferring the acrylic copolymer layer on the liner onto both sides of the conductive nonwoven to form a conductive nonwoven pressure sensitive adhesive layer, with the adhesive positioned within at least a portion of the passageways of the conductive nonwoven, and laminating the conductive nonwoven pressure sensitive adhesive layer on to a metal backing.

Each method can be combined to form the conductive, single-sided tape 10, 100, 200 of the present invention. For example, in the third embodiment of the conductive, single-sided tape 200, the first and second adhesive layers 208 and 210 may be fabricated using the same process, or different processes. In one embodiment, one adhesive layer may be made from a solution coating process on a release liner and then laminated by a transfer process to the nonwoven substrate. The second adhesive layer may be made by an imbibing process, e.g. coating an adhesive solution directly onto the nonwoven substrate and then drying and optionally, curing.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following example are on a weight basis.

Test Methods

Electrical Resistance

Figure 4:
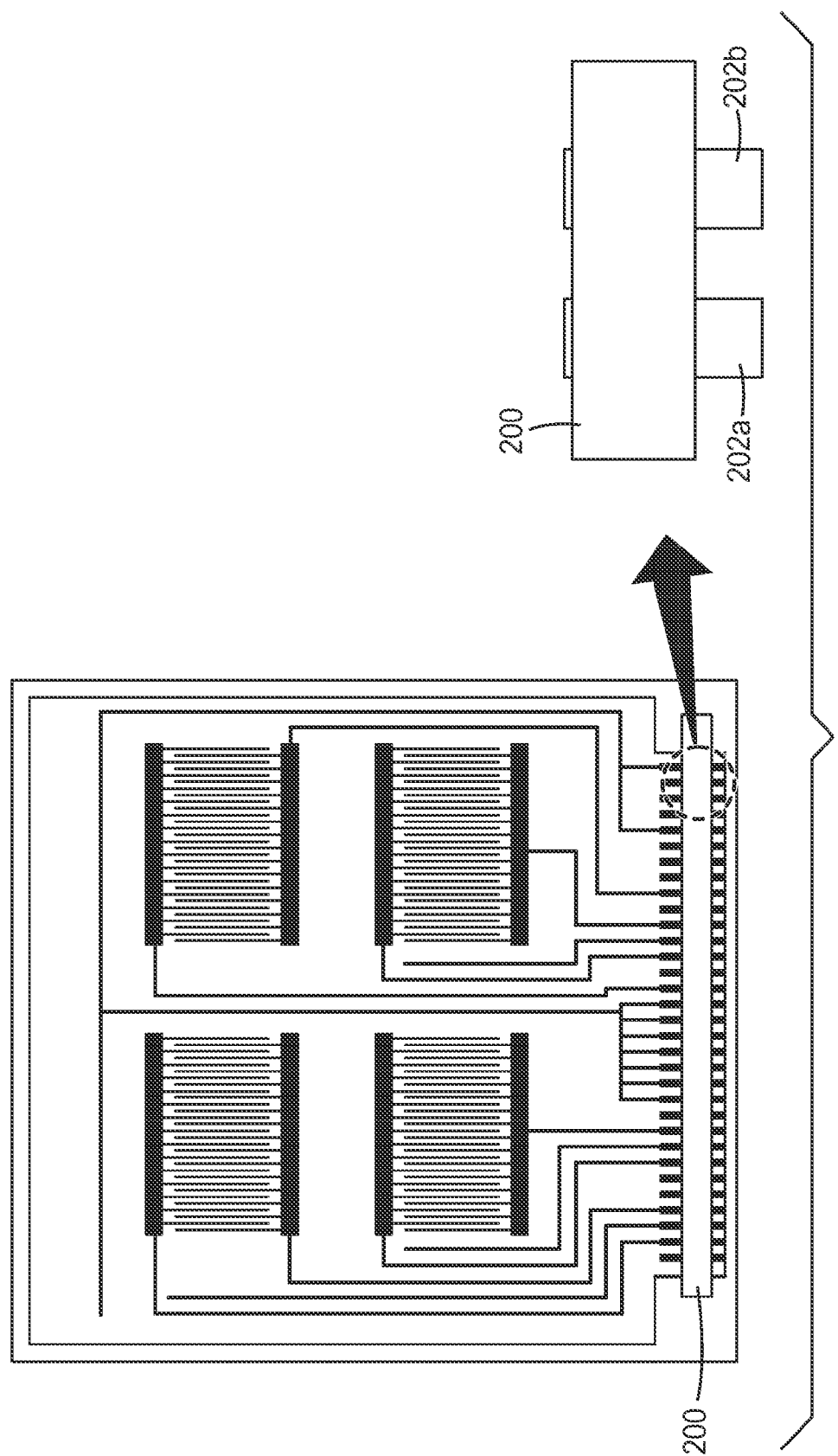
FIG. 4 is a schematic view of a method of measuring electrical resistance of a conductive, single-sided tape.

To measure the electrical resistance to small size contacts, the tapes were evaluated by measuring the electrical resistance between electrodes on an IPC-B-25A test board available from Diversified Systems, Inc., Indianapolis, Ind. A strip of conductive foil tape 200 that was 100 mm in length by 5 mm wide was hand laminated across electrodes 202a and 202b of the IPC-B-25A test board, as shown in FIG. 4. After 20 minutes of dwell time, the electrical resistance between electrode A and B, as shown in FIG. 4, was measured using a Keithley 580 micro-ohmmeter available from Keithley Instruments Inc., Cleveland, Ohio. The electrical resistance was recorded 10 seconds after the leads of the micro-ohmmeter contacted the electrodes of the test panel.

Adhesion

180° peel adhesion was measured according to ASTM 1000 with a stainless steel panel as the substrate.

Handling Performance

Handling performance was evaluated by examining the curling of the film. The film was cut into a 100 mm×25 mm strip and then the release liner was removed. The curling of the film was then observed visually.

Example 1

A conductive, pressure sensitive adhesive (PSA) was prepared as follows. A monomer premix was prepared, on a weight basis, using 75 parts 2-ethylhexyl acrylate, 25 parts N-vinylcaprolactam and 0.04 parts 2,2-dimethoxy-2-phenylacetophenone photoinitiator (available under the trade designation IRGACURE 651 from BASF Corporation, Florham Park, N.J.). This mixture was partially polymerized under a nitrogen-rich atmosphere by exposure to ultraviolet radiation yielding a syrup having a viscosity of about 3,500 cps. On a weight basis, an adhesive precursor solution was prepared from 100 parts of syrup, 0.1 parts additional 2,2-dimethoxy-2-phenylacetophenone photoinitiator, 0.1 parts 1,6-hexanediol diacrylate. 100 parts nickel particle having a particle size of about 4 microns (available under the trade designation T123 Nickel Powder from Vale Canada Limited., Toronto, Canada), and 5.4 parts fumed silica (available under the trade designation AEROSIL R 972 from Evonik Industries, Essen, Germany). The components were mixed together using conventional high shear mixing.

The adhesive film was made by passing 28 micron thick polyester, nonwoven scrim coated with multiple, thin layers of metal, nickel/copper/nickel, (available under the trade designation PNW-30-PCN from Ajin-Electron Co., Ltd. Busan, Korea) and the adhesive precursor solution between silicone treated transparent release liners through a conventional two roll coater. The gap between the coater rolls was set at about 40 micron. The coated adhesive precursor solution was cured by UV radiation having an intensity of about 3.0 mW/cm$^2$ on both the top side and bottom side of the film. Curing on the top and bottom was conducted simultaneously with exposure to UV radiation for about 520 seconds.

One of the silicone treated transparent release liners was removed and replaced by a multi-layer backing comprising a 12 micron thick black polyethylene terephthalate film adhered to a 7 micron thick aluminum foil, available under the trade designation SI-T19BDL from Suin Industry, Pyeongtaek-si, Gyeonggi-do, South Korea. The multi-layer backing was laminated by conventional techniques directly to the adhesive film via the previously coated PSA, such that, the aluminum foil was in contact with the PSA, producing the conductive foil tape of Example 1.

Following the test method procedures described above, the electrical resistance, adhesion and handling performance were measured. The electrical resistance was measured to be 0.5 ohms. Peel adhesion was 900 grams force/inch (354 grams force/cm). Handling performance was good with Example 1 exhibiting only a slight amount of curl.

Example 2

A conductive, pressure sensitive adhesive (PSA) was prepared as follows. An acrylic copolymer solution (available under the trade name DB1330W from Dubong Ind., Incheon, Korea) was mixed with an epoxy crosslinker (available under the trade name 5BT from Dubong Ind., Incheon, Korea), on a weight basis, using 100 parts acrylic copolymer solution, 0.1 parts epoxy crosslinker and 25 part toluene and 12 part nickel particle T123. The components were mixed together using conventional high shear mixing.

The PSA precursor was coated on a silicone treated paper liner by conventional notch bar coating method and dried by passing through heating chambers. The adhesive film was made by laminating the dried PSA precursor onto both sides of the 28 micron thick conductive nonwoven scrim by pressing between the laminating rolls.

One of the silicone treated paper liners was removed and replaced by a multi-layer backing comprising a 12 micron thick black polyethylene terephthalate film adhered to a 7 micron thick aluminum foil, available under the trade designation SI-T19BDL from Suin Industry, Pyeongtaek-si, Gyeonggi-do, South Korea. The multi-layer backing was laminated by conventional techniques directly to the adhesive film via the previously coated PSA, such that, the aluminum foil was in contact with the PSA, producing the conductive foil tape of Example 2.

Following the test method procedures described above, the electrical resistance, adhesion and handling performance were measured. The electrical resistance was measured to be 0.7 ohms. Peel adhesion was 1200 grams force/inch. Handling performance was good with Example 2 exhibiting only a slight amount of curl.

Example 3

A conductive, thermosetting pressure sensitive adhesive (PSA) was prepared as follows. A monomer premix was prepared, on a weight basis, using 70 parts butyl acrylate, 30 parts n-vinylcaprolactam and 6 part of phenoxy resin (available under the trade name PKHP-200 from InChem Corporation, Rock Hill, S.C.). The components were mixed together using conventional high shear mixing for 24 hours to dissolve the phenoxy resin. An adhesive precursor solution was prepared by adding the following to the monomer premix, 0.1 parts 1,6-hexanediol diacrylate, 0.1 parts 2,2-dimethoxy-2-phenylacetophenone photoinitiator (available under the trade designation IRGACURE 651 from BASF Corporation, Florham Park, N.J.), 30 parts of a liquid epoxy resin (available under the trade name YD128 from Kukdo Chem. Seoul Korea), 30 parts epoxy resin (available under the trade designation EHPE 3150 product grade CE from Daicel Chemical Industries, LTD., Tokyo, Japan), 6 parts of an epoxy cross-linker dicyandiamide (available under the trade designation Dicyanex 1400B from Air Products and Chemicals, Inc., Allentown, Pa.), 2 parts of a substituted urea-based accelerator (available under the trade designation Amicure UR from Air Products and Chemicals, Inc.), 15 parts of a microsphere (available under the trade designation Paraloid EXL-2330 from Dow Chemical Company, Midland, Mich.) and 100 parts nickel particle having a particle size of about 4 microns (available under the trade designation T123 Nickel Powder from Vale Canada Limited., Toronto, Canada) were added together and mixed using conventional high shear mixing for 1 hours.

The adhesive film was made by passing 28 micron thick polyester, nonwoven scrim coated with multiple, thin layers of metal, nickel/copper/nickel, (available under the trade designation PNW-30-PCN from Ajin-Electron Co., Ltd. Busan, Korea) and the thermosetting adhesive precursor solution between silicone treated transparent release liners through a conventional two roll coater. The gap between the coater rolls was set at about 40 micron. The coated thermosetting adhesive precursor solution was cured by UV radiation having an intensity of about 3.0 mW/cm$^2$ on both the top side and bottom side of the film. Curing on the top and bottom was conducted simultaneously with exposure to UV radiation for about 520 seconds.

One of the silicone treated transparent release liners was removed and replaced by 8 um copper foil tape available from LS Metron, Seoul Korea. The copper foil backing was laminated by conventional techniques directly to the adhesive film via the previously coated thermosetting PSA, such that, the copper foil was in contact with the PSA, producing the conductive foil tape of Example 3.

The sample was tested using the test methods described above for electrical resistance and adhesion with the following modification. The lamination was carried out by heat curing under a pressure 2 MPa, at 160° C. for 30 minutes. After 20 minutes of residual time at room temperature, the electrical resistance and adhesion were measured. The electrical resistance was measured to be 0.5 ohms. Peel adhesion was not measurable because of the copper backing was torn when the adhesion was measured.

Comparative Example A

Comparative Example A was an electrically conductive tape available under the trade designation ALB7610 from Sony Chemical, Tokyo, Japan. Following the test method procedures described above, the electrical resistance was measured to be 10 ohms, peel adhesion was 700 grams force/inch (276 grams force/cm) and the handling performance was poor with the sample curling a significant amount, yielding a coiled structure instead of an extended, flat film.

Although the present invention has been described with reference to preferred embodiments, workers skilled in the art will recognize that changes may be made in form and detail without departing from the spirit and scope of the invention.

What is claimed is:

1. A conductive single-sided tape comprising:
   a conductive, nonwoven adhesive layer comprising:
      a conductive nonwoven substrate having a plurality of passageways;
      an adhesive material positioned within at least a portion of the passageways and deposited as a layer on surfaces of the conductive nonwoven substrate; and
      a plurality of metal particles dispersed within the adhesive material; and
   a continuous metal layer positioned adjacent the nonwoven adhesive layer.

2. The conductive single-sided tape of claim 1, further comprising a polymeric film positioned adjacent the metal layer.

3. The conductive single-sided tape of claim 1, further comprising a release liner positioned adjacent the conductive nonwoven adhesive layer.

4. The conductive single-sided tape of claim 1, wherein the metal particles comprise at least one of nickel, copper, tin, aluminum, silver, silver coated copper, silver coated nickel, silver coated aluminum, silver coated tin, silver coated gold, silver coated graphite, silver coated glass, silver coated ceramics, silver coated plastics, silver coated silica, silver coated elastomers, silver coated mica, nickel coated copper, nickel coated silver, nickel coated graphite, nickel coated glass, nickel coated ceramics, nickel coated plastics, nickel coated silica, nickel coated elastomers, nickel coated mica, and combinations thereof.

5. The conductive single-sided tape of claim 1, wherein the conductive single-sided tape is between about 25 and about 150 μm thick.

6. The conductive single-sided tape of claim 1, wherein the conductive nonwoven substrate includes a conductive coating.

7. The conductive single-sided tape of claim 1, wherein the adhesive material is a pressure sensitive adhesive material.

8. The conductive single-sided tape of claim 1, wherein the adhesive material is an UV B-stageable adhesive material.

9. The conductive single-sided tape of claim 1, further comprising at least one additional filler selected from the group consisting of a heat conductive filler, a flame resistant filler, an anti-static agent, a foaming agent, polymeric microspheres and thermosets.

10. The conductive, single-sided tape of claim 1, wherein the adhesive layer comprises a first adhesive layer and a second adhesive layer.

11. The conductive, single-sided tape of claim 10, wherein the first adhesive layer comprises one metal particle type.

12. The conductive, single-sided tape of claim 10, wherein the second adhesive layer comprises at least two metal particles types.

13. The conductive, single-sided tape of claim 10, wherein the first adhesive layer is manufactured using a solution coating process and laminating by a transfer process to the conductive nonwoven substrate.

14. The conductive, single-sided tape of claim 10, wherein the second adhesive layer is manufactured using an imbibing process.

15. The conductive, single-sided tape of claim 14, wherein the second adhesive layer is manufactured by coating an adhesive solution directly onto the conductive nonwoven substrate, drying and, optionally, curing.

16. The conductive, single-sided tape of claim 14, wherein the second adhesive layer is manufactured by coating an adhesive precursor solution directly onto the conductive nonwoven substrate, and curing the adhesive precursor solution.

17. The conductive, single-sided tape of claim 1, wherein the passageways are filled with adhesive material such that the conductive nonwoven substrate includes less than about 10% voids.

18. The conductive, single-sided tape of claim 1, wherein the passageways are filled with adhesive material such that the conductive nonwoven substrate includes less than about 2% voids.

* * * * *